United States Patent [19]

Stern

[11] Patent Number: 4,643,578
[45] Date of Patent: Feb. 17, 1987

[54] ARRANGEMENT FOR SCANNED 3-D MEASUREMENT

[75] Inventor: Howard Stern, Greenlawn, N.Y.

[73] Assignee: Robotic Vision Systems, Inc., Hauppauge, N.Y.

[21] Appl. No.: 708,155

[22] Filed: Mar. 4, 1985

[51] Int. Cl.[4] .............................................. G01B 11/24
[52] U.S. Cl. ...................................... 356/376; 356/1; 358/93
[58] Field of Search .................. 358/93, 106, 107, 225; 356/1, 376

[56] References Cited

U.S. PATENT DOCUMENTS 4,168,512  9/1979  Ito et al. ................................ 356/225
4,493,968  1/1985  Brown .................................. 356/376
4,494,874  1/1985  DiMatteo et al. ................... 356/376

Primary Examiner—R. A. Rosenberger
Attorney, Agent, or Firm—Max Fogiel

[57] ABSTRACT

Three-dimensional surface measurements are made in the presence of interfering background light such as weld arc glare by scanning the surface with a narrow light beam and synchronously masking the image of the illuminated surface to block all light within the area of expected light returned by the surface from the scanned light beam. The masking is moved synchronously across the image area as the expected returned light follows the scanned path of the scanning light beam. Masking is accomplished mechanically or by electro-optic devices.

6 Claims, 6 Drawing Figures

U.S. Patent  Feb. 17, 1987  Sheet 2 of 2  4,643,578

ARRANGEMENT FOR SCANNED 3-D MEASUREMENT

BACKGROUND OF THE INVENTION

Three dimensional measurement systems are being increasingly employed for vision systems in industrial environments. The environments often produce interference phenomena that reduce the ability of the vision system to make the needed measurements. Welding arc glare and other ambient light adversely affect vision systems sensitive to light of similar wavelengths. Much of the problem stems from using sensing devices that are exposed to the interfering light for more time than is absolutely necessary.

A measurement can only be made, by optical triangulation systems that project light patterns, when the projected light can be detected against any background light that is present. As the background light increases, the projected light intensity must be increased or some means of reducing the background light received by the reflected light sensor must be devised. By concentrating all the projected energy into a narrow beam, contrast is enhanced and ambiguities from multiple reflections are more easily resolved. A line sensor aligned to the area where the expected image of the narrow beam will fall optimally satisfies these requirements. The cost of line sensors are high, however, and it is preferred to use a lower cost TV sensor. This is particularly true when the light beam is scanned to increase the amount of measured data, for then the reflected image must be synchronously scanned to remain focused on the line sensor—a requirement that is not needed when an area sensing TV camera is used. The TV camera, however, suffers from its long integration period relative to the short time the image of the projected light beam dwells on any one part of the sensing surface.

SUMMARY OF THE INVENTION

It is an object of the present invention to overcome the prior art disadvantages. In particular, it is the object of the present invention to provide an arrangement for reducing the amount of extraneous light that enters an area sensing element of a 3-D measuring system based on optical triangulation.

In keeping with this object, and with still others which will become apparent as the description proceeds, the important characteristics of the invention are potentially lower cost, and improved performance.

According to the present invention, the direction of a narrow beam of light (although the term light is used, it is to be understood that the principles apply outside the visible spectrum) is swept across the surface to be measured. The image of the spot on the surface illuminated by the beam is converted to an electrical signal by a TV camera, and processed to produce the three-dimensional coordinates of the spot from the known separation of camera and light projector, and the angles of the light paths.

In a first preferred embodiment a mechanical mask with a narrow slit is caused to pass in front of the sensing surface in synchronism with the anticipated image position. In a second preferred embodiment an electro-optical device, such as a liquid crystal device (LCD) or PLZT device, is placed in front of the sensing surface to block all light except where the image is expected.

The invention will hereafter be described with reference to an exemplary embodiment, as illustrated in the drawing. However, it is to be understood that this embodiment is illustrated and described for the purpose of information only, and that nothing therein is to be considered limiting of any aspect of the invention.

BRIEF DESCRIPTION OF THE DRAWINGS

FIG. 3b is a side view of the arrangement of FIG. 3a;

DESCRIPTION OF THE PREFERRED EMBODIMENTS

Figure 1:
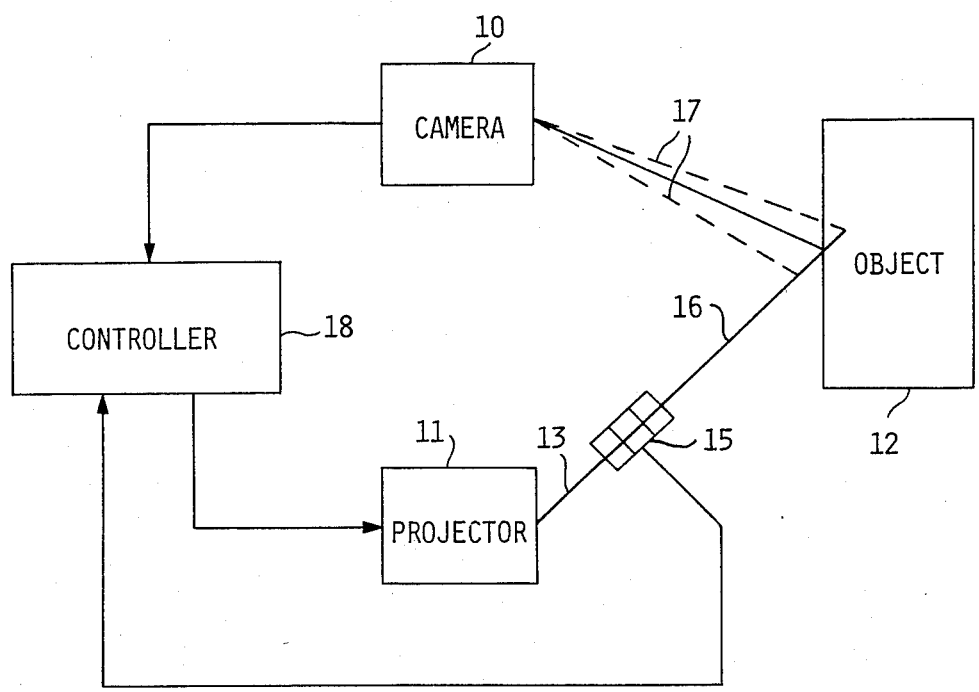
FIG. 1 is a block diagram showing schematically the top view of a 3-D optical measurement system used with the invention.

FIG. 1 shows schematically a top view of a 3-D optical measurement system based on triangulation. Controller 18 causes projector 11 to emit a narrow beam of light 13 which is scanned vertically by rotating mirrors on wheel 15 whose angle is reported to controller 18. The vertically scanned light beam 16 illuminates a small section of the surface of object 12 to be measured. The small section is the intersection of the vertical plane formed by scanning beam 16 and the object 12 surface. TV camera 10 has a horizontal view angle indicated by limit rays 17, and a vertical view angle sufficient to encompass the vertical scan of beam 16. Camera 10 is thereby able to convert an image of the illuminated section of object 12 surface to a standard TV signal that is sent to controller 18. Controller 18 records the image. From the recording and knowledge of the separation of TV camera 10 and projector 11 together with knowledge of the projected beam 13 and camera 10 image angles, the three dimensional coordinates of all the illuminated points on the surface of object 12 are computed. The knowledge of these values are known by design and can be improved upon by calibration.

TV camera 10, if conforming to the standard 60 fields per second format, will integrate light in its field of view for most of each 1/60 second. If beam 16 is scanned synchronously with the 60 Hz field rate, by use of, for example, a phase-locked rotation control on wheel 15, then the image of the illuminated spot on object 12 surface races down the face of the sensor chip at a rate comparable to the TV line rate of 63.5 μsec per line. In this manner, the desired light from the projected beam on object 12 surface will be integrated by a pixel on the TV sensor surface for around 63μ seconds and integrate background light, which may include arc welding glare, for 1/60 second. This provides the interfering glare with a 260:1 advantage.

Figure 2:
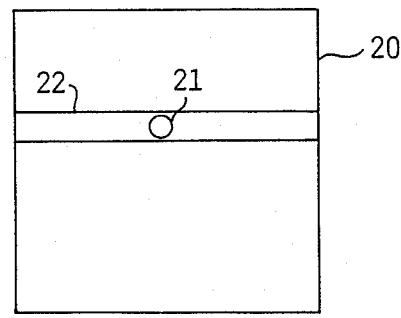
FIG. 2 shows the sensing area with an imaged spot and preferred masking.

The present invention improves the performance of the system by blocking light from the TV sensing area except when the image is expected to be present. FIG. 2 illustrates the surface of the TV sensing area 20. An image of projected beam 16 on object 12 surface may appear as a spot 21. The left to right position of spot 21 represents various distances along beam 16, thereby providing the measurement of the exact coordinates of the object 12 surface relative to the measurement system. Since the image must lie along the image of the beam 16, which would be nearly horizontal on TV surface 20, any other received light is deterimental to system performance. Some keystoning generally prevents the image from being horizontal. If a mask is placed over TV sensing surface 20, with an opening 22 wide enough to admit the expected image, and synchronized to have the opening 22 travel with the expected image sweep rate down the surface 20, then most of the interfering light would be blocked.

Figure 3A:
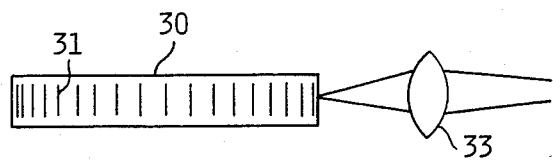
FIG. 3a is a top view of an arrangement for implementing preferred masking mechanically.
Figure 3B:
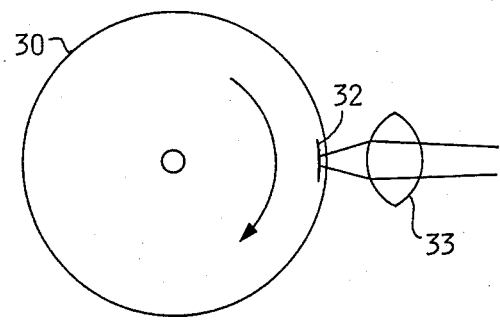
Figure 3C:
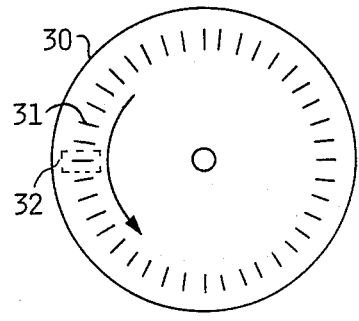
FIG. 3c is a side view of an alternate embodiment of the arrangement of FIG. 3b.

FIGS. 3a to 3c illustrate two mechanical means for accomplishing the masking. FIG. 3a shows a top view of rotating wheel 30 with the required slots 31. The rest of the wheel is opaque. FIG. 3b shows the wheel 30 from the side with an imaging lens 33 focusing the image on TV sensor surface 32. However, only light passing through a slot 31 reaches surface 32. Slots 31 are spaced such that each 1/60 sec. one slot will travel synchronously down the face of surface 32 with the image of projected beam 16. Wheel 30 can be phase-locked to the sweep rate to maintain synchronization. FIG. 3c shows an alternate approach with radial slots 31 on a wheel 30. Light passing through slots 31 to TV sensor surface 32 behind the wheel 30 could be made to more closely match the keystoning effect due to the slots continuously changing slope as wheel 30 rotates. In each case the mask is close to the TV sensor surface 32 to provide good image plane shuttering.

Figure 4:
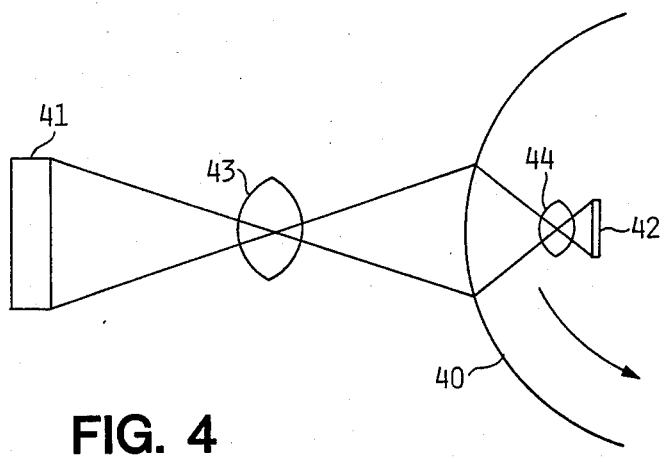
FIG. 4 shows a means for enlarging the image for masking.

FIG. 4 illustrates an arrangement for masking out the interfering light on an enlarged image to overcome practical problems associated with the small dimensions of a TV sensor. Light from object 41 is imaged onto a rotating, slotted mask surface 40 at some convenient size by lens 43. Light passing through slots in wheel 40 is imaged by lens 44 onto TV sensor surface 42.

It is desirable to eliminate moving parts in vision sensors so another preferred embodiment substitutes an electrooptic mask for the rotating mechanical masks. A device, such as an LCD or PLZT device, controlled by controller 18 to synchronously transmit light along expected image area 22 of TV sensor surface 20 as the expected image travels down the surface 20, can be employed for this task. The masking device can be placed next to the sensor surface if its dimensions are compatible or by using the method of FIG. 4. The masking can be implemented on an image of a size compatible with the masking device.

Devices such as LCD's can be made with various controlled areas. Thus a horizontal striped unit could be commanded to make one stripe at a time become transparent such as area 22. The pattern could also be custom-designed to accommodate keystoning and still use simple line at a time control rather than the more complex drive needed for a standard matrix of cells type of LCD.

The invention has been described and illustrated with reference to an exemplary embodiment. It is not to be considered limited thereto, inasmuch as all modifications and variations which might offer themselves are intended to be encompassed within the scope of the appended claims.

What is claimed is:

1. A method for optically increasing the reliability of three-dimensional measurements in the presence of bright background light, comprising the steps of: scanning a surface to be measured with a narrow light beam; imaging light reflected from said light beam by said surface; masking said image to block light outside a predetermined image area; scanning said masking synchronously with said scanned light beam; recording by a light-sensitive surface said image after said masking; reading out said recording; an determining the three-dimensional coordinates of said surface to be measured at points illuminated by said scanning light beam based on the geometric relationship of said scanning light beam and said reflected light.

2. An arrangement for masking background light from a three-dimensional measuring system receiver to improve measurement reliability, comprising: means for projecting a narrow beam of light; means for scanning a surface to be measured with said beam of light; means for imaging light reflected from said beam of light by said surface; means for masking said image to block light outside a predetermined image area; means for scanning said mask synchronously with said scanned light beam; and means for recording said image after said masking.

3. An arrangement as defined in claim 2, where said masking is produced mechanically.

4. An arrangement as defined in claim 2, wherein said masking is produced by electro-optic means.

5. An arrangement as defined in claim 4, wherein said electro-optic means is an LCD.

6. An arrangement as defined in claim 4, wherein said electro-optic means comprises PLZT means.

* * * * *